Figure 1:
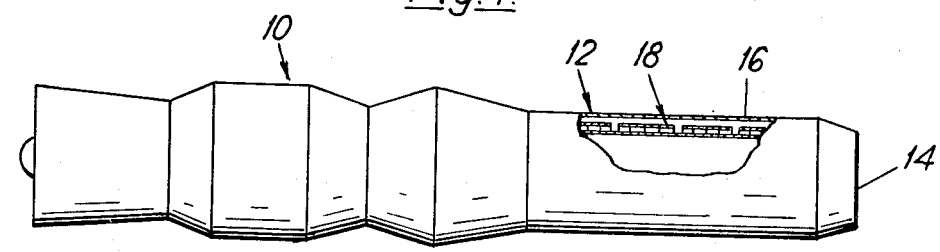

United States Patent [19]

Wilkinson

[11] 4,161,231
[45] Jul. 17, 1979

[54] METAL CAVITATED SANDWICH STRUCTURES

[75] Inventor: Wilfred H. Wilkinson, Turnditch, England

[73] Assignee: Rolls-Royce Limited, London, England

[21] Appl. No.: 855,720

[22] Filed: Nov. 29, 1977

Related U.S. Application Data

[63] Continuation of Ser. No. 518,964, Oct. 29, 1974, abandoned.

[30] Foreign Application Priority Data

Oct. 31, 1973 [GB] United Kingdom ............... 50690/73

[51] Int. Cl.² .................................................. F01N 1/24
[52] U.S. Cl. ..................................... 181/292; 181/213; 138/149; 138/155
[58] Field of Search ................ 138/149, 155; 428/116, 428/99, 100, 73, 74; 52/573, 579; 181/222, 292, 228, 227, 252, 256, 284, 287, 288

[56] References Cited

U.S. PATENT DOCUMENTS

| | | | |
|---|---|---|---|
| 2,362,859 | 11/1944 | Rosenblatt | 181/292 |
| 2,599,210 | 6/1952 | Thompson | 138/149 |
| 2,674,336 | 4/1954 | Lemmerman | 181/222 |
| 2,931,214 | 4/1960 | Maccaferri | 181/292 X |
| 3,095,943 | 7/1963 | Kemp | 181/292 |
| 3,109,209 | 11/1963 | Beam | 52/573 X |
| 3,430,663 | 3/1969 | Sickbert | 138/149 X |
| 3,519,523 | 7/1970 | Rodman et al. | 428/53 |
| 3,685,611 | 8/1972 | Duvvuri | 181/223 |
| 3,821,999 | 7/1974 | Guess et al. | 181/33 H |
| 3,903,928 | 9/1975 | Sykes et al. | 138/109 |

*Primary Examiner*—Richard E. Aegerter
*Assistant Examiner*—James E. Bryant, III
*Attorney, Agent, or Firm*—Cushman, Darby & Cushman

[57] ABSTRACT

A jet pipe wall is made from a honeycomb sandwich structure in which the skin forming one side of the sandwich is cut into many small square sheet pieces so that when differential longitudinal expansion occurs between the skins as a result of lying in fluid flows of differing temperature, the total shear felt by the honeycomb is divided equally between those areas of honeycomb covered by respective small sheet pieces, so that the overall shear effect is reduced.

9 Claims, 5 Drawing Figures

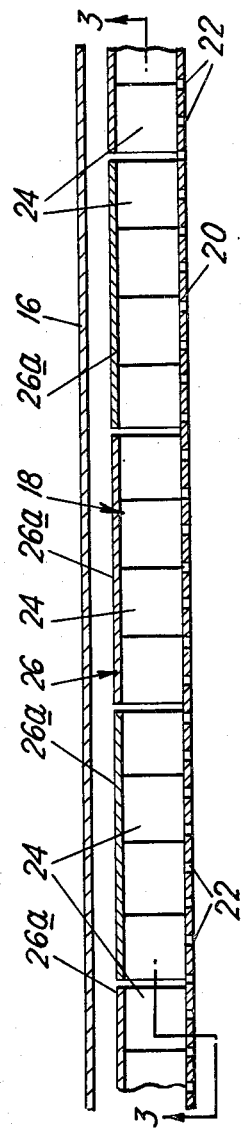
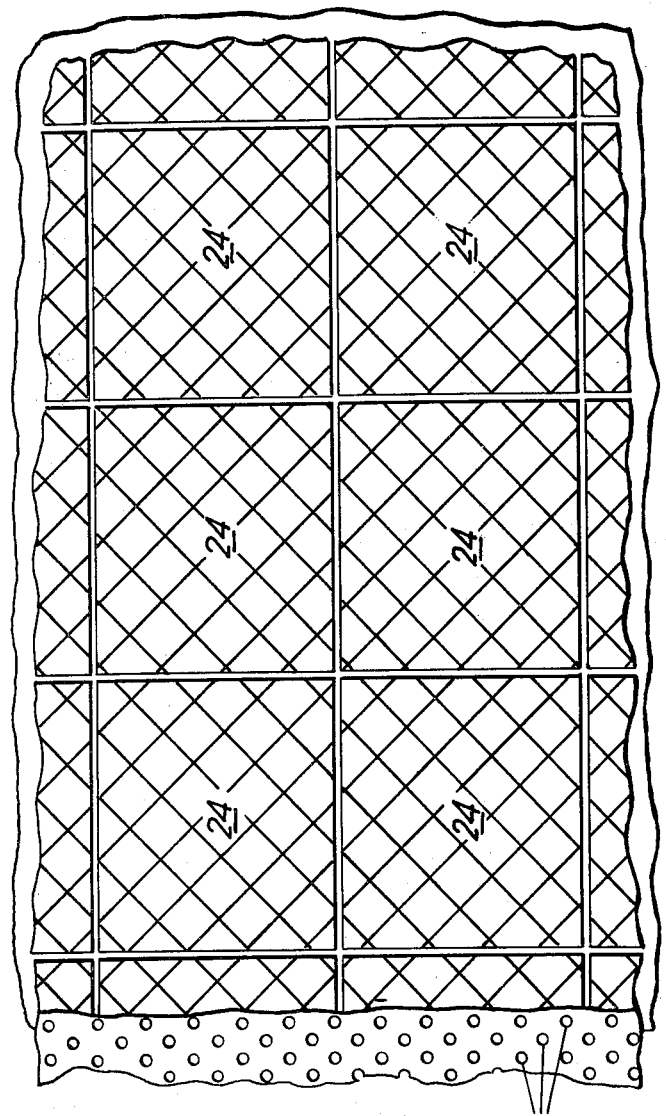

METAL CAVITATED SANDWICH STRUCTURES

This is a continuation of application Ser. No. 518,964, filed Oct. 29, 1974, now abandoned.

This invention concerns metal cellular sandwich structures, for inter alia, duct walls.

Cellular sandwich assemblies, e.g. two sheets with a honeycomb structure between them have been found useful for the purpose of providing lightweight wall structures or sound attenuation cavities in the walls of ducts through which hot or cold gas flows.

However, where the gas flow has a temperature gradient which changes from very hot to relatively very cold within a distance equal to the sandwich thickness, which conditions are met within, for example, the jet pipe of a gas turbine jet propulsion engine, there arises the problem of differential expansion between the two sheets of metal which enclose the honeycomb to make the sandwich, one of which sheets may be perforate and lies in the hot gas stream, and the other of which sheets lies in, or adjacent a relatively cool flow of air or ambient air. The expansion comprises the heated sheet increasing its length and attempting to stretch the honeycomb in like manner, but the relatively cool sheet restrains the honeycomb with the result that the honeycomb is subjected to shear stress and ruptures, and the perforate sheet cracks on a line or lines which includes rows of holes.

Consequently it is an object of this invention to provide a cellular sandwich structure for use in a situation which subjects said structure to severe temperature gradients, which structure will not be subjected to severe shear stress due to differential expansion.

Accordingly the present invention comprises a cellular sandwich structure including at least one cellular member sandwiched between first and second metal sheets and wherein one of said sheets is comprised of a plurality of sheet pieces, each of which is very small relative to the second sheet.

Preferably one of said sheets is perforate.

Preferably said sheet pieces have their adjacent edges spaced apart.

Alternatively, said sheet pieces have adjacent edges in overlapping, sliding relationships with each other.

Figure 4:
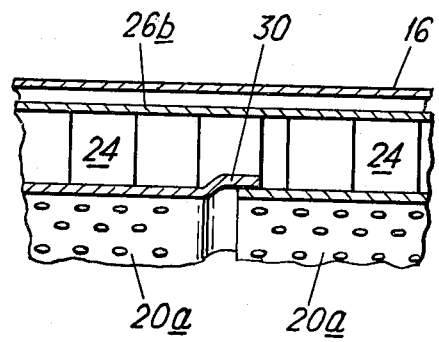
Figure 5:
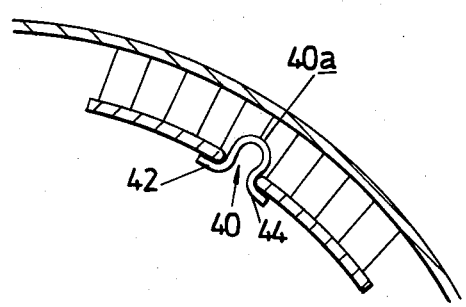

The invention will now be described, by way of example only and with reference to the accompanying drawings in which:

FIG. 1 is a diagrammatic view of a gas turbine jet propulsion engine and jet pipe, FIG. 2 is an enlarged part view of FIG. 1, FIG. 3 is a view on line 3—3 of FIG. 2, FIG. 4 is a part view of an alternative embodiment of the invention, and FIG. 5 is a cross-sectional part view on line 5—5 of FIG. 1.

In FIG. 1 a gas turbine engine is indicated by the numeral 10. The engine is well known in the art and will not be described. A jet pipe 12 is affixed to the downstream end of the engine 10 and comprises a tube which terminates in an exhaust nozzle 14.

Jet pipe 12 is double walled in that it has an outer skin 16 and an inner skin 18 spaced therefrom, for the greater part of the inner skin's length.

Inner skin 18 is a honeycomb sandwich structure and is best seen in FIGS. 2 and 3. It includes a perforate inner skin 20, the perforations being small holes 22, a plurality of honeycomb members 24 rigidly attached by welding or bonding to the outside of the inner skin and a outer skin 26 made up of a plurality of small rectangular sheet pieces 26a each of which is welded to the rims of the cavity of a respective honeycomb member 24, so that each cavity is a closed structure, except for the perforations 22 in skin 20 and through which, in operation, sound energy penetrates and is contained within each cavity until it has decayed.

The honeycomb structure 18 is fixed by one end (not shown) to jet pipe 16, by welding or some other suitable means, and is slidingly located by its other end to the other end of the jet pipe (neither of which ends are shown) so as to allow inner skin 20 to expand longitudinally of itself and relative to outer skin plates 26a, when in operation it is heated by hot gases from the turbine (not shown) of the engine 10 which hot gases flow through jet pipe 12 to exhaust nozzle 14.

When skin 20 expands, it causes the honeycomb members 24 to move with it. However, skin 26 which is cool relative to skin 20 and therefore does not expand so much or so quickly as skin 20, attempts to restrain the movement, whereupon the honeycomb members 24 are placed in shear. The effect of the shear stress is considerably reduced however, by constructing skin 26 as described hereinbefore, i.e. from a number of spaced apart sheet pieces 26a, each covering a respective honeycomb member 24. This ensures that the total expansion experienced by skin 20 is shared equally by each honeycomb member and similarly, each honeycomb member feels only that resistance to its movement which is put up by its respective sheet piece 26a and the effect of the expansion of skin 20 is not felt accumulatively by any one of the honeycomb members 24 or sheet pieces 26a.

FIG. 4 illustrates a further embodiment wherein jet pipe 16 is lined with a honeycomb sandwich which is constructed differently from the embodiments of FIG. 2 and FIG. 3 in that outer skin 26b is made from a one piece sheet and the perforate inner skin is made up of a number of sheet pieces 20a, each of which has one edge 30 bent so as to overlap the next adjacent plate in sliding, gas sealing relationship. Honeycomb members 24 are welded to their respective perforate sheet pieces 20a and to skin 26b.

When perforate sheet pieces 20a heat up and expand during operation of the engine, they will slide relative to each other and each one will move its respective honeycomb member but, as with the first embodiment, because each sheet piece 20a is small, the magnitude of its expansion will be small, so that the shear stress set up in the respective honeycomb member will not be sufficiently high to cause the honeycomb member to rupture.

The precise size to which the respective skin sheet pieces and honeycomb members should be formed, depends on the expansion and strength characteristics of the materials used to make the invention and the honeycomb shape, but tests indicate that the squares of honeycomb members and skin sheet pieces may be as small as four square inches in area.

A further alternative is to merely make one of the sheets from a number of small sheet pieces as described hereinbefore, but make the honeycomb member as an integral member. This arrangement will cause the honeycomb member to feel shear stress set up by expansion of the hot skin sheet (if the hot skin is also an integral member) but its attempts to expand therewith will only be resisted locally by each respective other small sheet piece. This arrangement would require that the sheet pieces be very small relative to the integral skin sheet, because stress concentrations would be developed in the continuous honeycomb structure between the adjacent small sheet piece edges. Thus, the greater the number of small sheet pieces, the greater the number of stress concentration points in the honeycomb structure to share the total stress.

The use of honeycomb structure has been mentioned throughout the foregoing description, but it should be appreciated that any structure which has cavities or at least forms cavities when placed between inner and outer skins, may be utilised.

As an alternative to the way shown in FIG. 4 of sealing between adjacent inner sheet pieces against the ingress of hot gases while maintaining the ability of differential expansion, FIG. 5 shows an elongate strip of metal 40 which has a U' shaped cross sectional profile with legs terminating in outwardly turned flanges 42 and 44. The fixing is achieved by welding flanges 42 and 44 of the metal strip 40, to respective edges of the skin pieces. As the honeycomb members expand or contract, the metal strip will flex.

I claim:

1. An improved sound absorbing sandwich structure for use in environments where a temperature differential across the structure thickness causes differential expansion and movement of the layers with respect to each other, the structure comprising: a first sheet metal layer, a second sheet metal layer having perforations therein, a rigid honeycomb cellular interlayer disposed between said first and second layers, and means rigidly attaching said interlayer by welding to each of said first layer and said second layer to provide a substantially rigid sandwich structure, the improvement being that one of the layers of sheet metal consists of a plurality of sheet pieces each of which has a small surface area relative to the other layer of sheet metal and each of which is disposed with each of its edges adjacent to respective edges of the adjacent sheet pieces such that there can be independent expansion or contraction of each sheet piece and the edges of each sheet piece can move without interference with respect to the adjacent edges of adjacent sheet pieces when the layers of the structure are subjected to a temperature differential and expand or contract differentially whereby overall shear stress across the sandwich structure is minimized and thereby prevents the second perforated sheet metal layer from cracking.

2. A structure as claimed in claim 1 in which the adjacent edges of adjacent sheet pieces are spaced apart by an amount sufficient to avoid contact therebetween as the layers of the structure expand or contract.

3. A structure as claimed in claim 1 in which the adjacent edges of adjacent sheet pieces are arranged in overlapping sliding relationship with each other.

4. A structure as claimed in claim 1 in which the adjacent edges of adjacent sheet pieces are joined together by respective resilient members.

5. A structure as claimed in claim 4 in which said resilient members are elongated strips having a U-shaped cross-section with legs terminating in outwardly turned flanges and in which each of the outwardly turned flanges of the strips is welded to a respective edge of a sheet piece.

6. A structure as claimed in claim 1 in which the cellular interlayer is also formed from a plurality of pieces, each sheet piece being welded to a respective cellular interlayer piece and each cellular interlayer piece being welded to the other sheet metal layer.

7. A sound absorbing sandwich structure for lining the inside of the exhaust duct of a gas turbine engine where said sandwich structure is subjected to a temperature differential across the same, comprising: a first sheet metal layer facing away from the exhaust gases, a second perforated sheet metal layer facing the exhaust gases and over which the exhaust gases flow, a rigid honeycomb cellular interlayer disposed therebetween, and means rigidly attaching said interlayer by welding to each of the first and second sheet metal layers to provide a substantially rigid sandwich structure, the first sheet metal layer being composed of a plurality of sheet pieces and the cellular interlayer being composed of a corresponding number of pieces each of which is welded to a respective sheet piece, adjacent edges of adjacent sheet pieces being spaced apart by an amount sufficient to avoid contact therebetween and permit independent expansion or contraction of the sheet pieces as the layers of the structure differentially expand or contract whereby overall shear stress across the sandwich structure is minimized and thereby prevents the second perforated sheet metal layer from cracking.

8. A sound absorbing sandwich structure for lining the inside of the exhaust duct of a gas turbine engine where said structure is subjected to a temperature differential across the same, comprising: a first sheet metal layer facing away from the exhaust gases, a second perforated sheet metal layer facing the exhaust gases and over which the exhaust gases flow, a rigid honeycomb cellular interlayer disposed therebetween, and means rigidly attaching said interlayer by welding to each of the first and second sheet metal layers to provide a substantially rigid sandwich structure, the second sheet metal layer being composed of a plurality of sheet pieces and the cellular interlayer being composed of a corresponding number of cellular interlayer pieces each of which is welded to a respective sheet piece, adjacent edges of adjacent sheet pieces being arranged in overlapping sliding relationship with each other to prevent penetration of exhaust gases to the interlayer and to permit independent expansion or contraction of the sheet pieces as the layers of the structure differentially expand and contract whereby overall shear stress across the sandwich structure is minimized and thereby prevents the second perforated sheet metal layer from cracking.

9. A sound absorbing sandwich structure for lining the inside of the exhaust duct of a gas turbine engine where said structure is subjected to a temperature differential across the same, comprising: a first sheet metal layer facing away from the exhaust gases, a second perforated sheet metal layer facing the exhaust gases and over which the exhaust gases flow, a rigid honeycomb cellular interlayer disposed therebetween, and means rigidly attaching said interlayer by welding to each of the first and second sheet metal layers to provide a substantially rigid sandwich structure, the second sheet metal layer being composed of a plurality of sheet pieces and the cellular interlayer being composed of a corresponding number of cellular interlayer pieces each of which is welded to a respective sheet piece, adjacent edges of adjacent sheet pieces being joined together by respective resilient elongated strips having a U-shaped cross-section with legs terminating in outwardly turned flanges, each outwardly turned flange of each resilient elongated strip being welded to a respective edge of a sheet piece to prevent penetration of exhaust gases to the cellular interlayer, said resilient elongated strips providing for independent expansion or contraction of the sheet pieces of said second sheet metal layer as the layers of the structure differentially expand or contract whereby overall shear stress across the sandwich structure is minimized and thereby prevents the second perforated sheet metal from cracking.

* * * * *